RADIOACTIVE THICKNESS GAUGE

Original Filed June 7, 1954 2 Sheets-Sheet 1

Inventors:
George B. Foster
Walter H. Canter, Jr.
By Anthony D. Cennamo
Attorney

RADIOACTIVE THICKNESS GAUGE

Original Filed June 7, 1954 2 Sheets-Sheet 2

Inventors:
George B. Foster
Walter H. Canter, Jr.
By Soans Glaister & Anderson Attys.

United States Patent Office

Re. 25,353
Reissued Mar. 19, 1963

25,353

RADIOACTIVE THICKNESS GAUGE

George B. Foster, Worthington, and Walter H. Canter, Jr., Columbus, Ohio, assignors to Industrial Nucleonics Corporation, Columbus, Ohio, a corporation of Ohio Original No. 2,933,606, dated Apr. 19, 1960, Ser. No. 434,786, June 7, 1954. Application for reissue Nov. 6, 1961, Ser. No. 154,093
18 Claims. (Cl. 250—83.3)

Matter enclosed in heavy brackets [ ] appears in the original patent but forms no part of this reissue specification; matter printed in italics indicates the additions made by reissue.

The present invention relates generally to devices employing electromagnetic radiation and more particularly to devices and methods for employing electromagnetic radiation produced by the passage of beta rays through a suitable target.

There is a need for sources of electromagnetic radiations (X-rays and gamma-rays) having average energies within the range of .05 to 0.50 mev. for radiation gauges such as are used for determining the thickness, weight, density, profile, etc. of various materials and products. Electromagnetic radiation within this range is available from commercial X-ray equipment and gamma emitting radioisotopes; however, each of these sources has considerable disadvantages. Commercial X-ray equipment is available which can produce X-rays having average energies within the range of about .02 to .10 mev. X-rays within this energy range have only a limited utility in radiation gauges because of their limited penetrating power. Commercial X-ray equipment is expensive, bulky, complicated to operate, and requires a certain amount of servicing. In addition, the intensity of the radiation produced by commercial X-ray equipment is less stable than the intensity of radiation emitted by gamma emitting radioisotopes. Practical radioisotopes are available which emit gamma rays having average energies from about .50 to 1.5 mev. However, the manufacturing, handling, and storage of the source capsuls containing such gamma ray emitters requires extreme precautions and expensive facilities.

The main object of the present invention is to provide a source of electromagnetic radiation for use in radiation gauges which is free of the disadvantages which are attendant with commercial X-ray equipment and gamma sources (radioisotopes).

Another object of the invention is to provide a method of and means for producing electromagnetic radiation having an average energy between .05 and .50 mev., the average energy being capable of preselection and variation at will, depending upon the particular use to be made of the radiation.

Further objects of the invention are: to provide a radiation gauge wherein electromagnetic radiation emitted as a result of the passage of beta rays through a suitable target is directed at the material to be measured; and to provide a radiation gauge such as a thickness gauge wherein the material to be measured is placed between a beta source and a detector, a target of sufficient thickness being positioned between the beta source and the material being measured so that most of the rays which reach the material being measured comprise electromagnetic radiation produced as a result of the deceleration or retardation of the beta rays by the electrostatic field of nuclei of the target material.

Further objects, advantages, and features of the invention will become apparent from the following description of a preferred embodiment thereof, taken together with the accompanying drawings.

Figures 4, 5, 6:
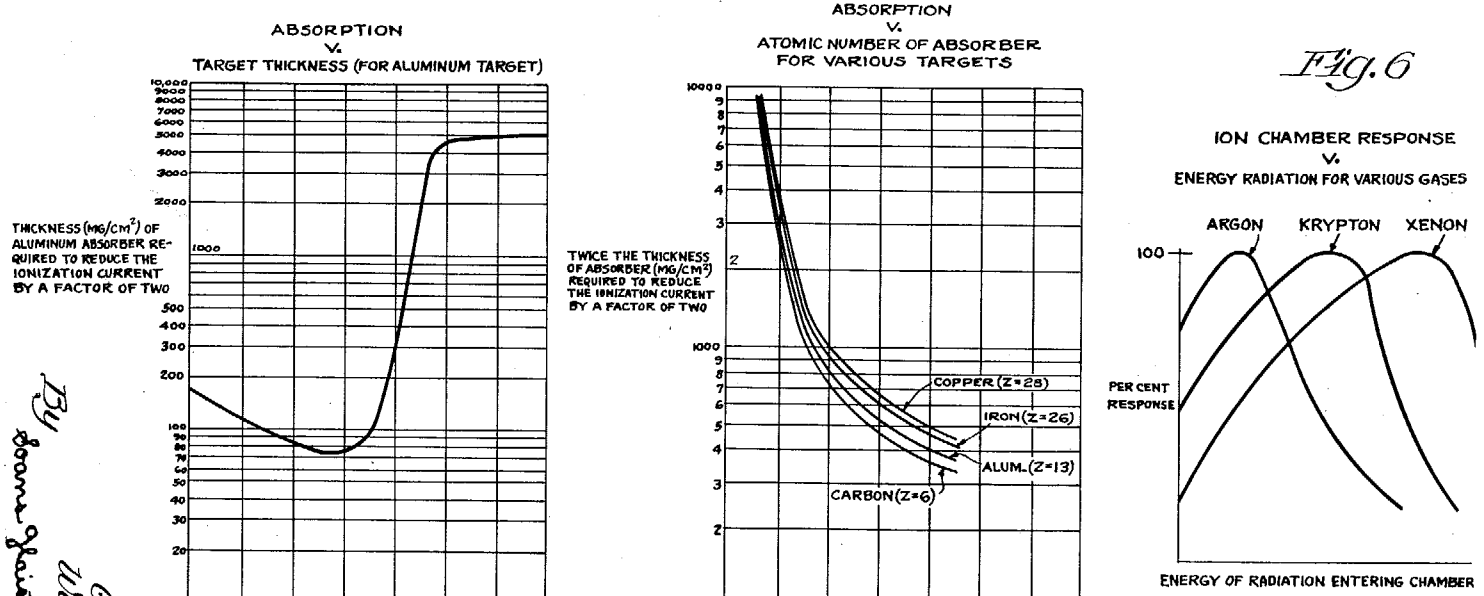
FIGURE 4 is a graph showing the effect of target thickness, in this graph the thickness of an aluminum absorber required to reduce the ionization current in an ionization chamber resulting from radiation passing through or emitted from the target to one-half its value is plotted against thicknesses of aluminum target.

FIGURE 5 is a graph showing the effect of the target material, in this graph twice the thickness of absorber material required to reduce the ionization current to one-half its value is plotted against the atomic number of the absorber material for various target materials; and FIGURE 6 is a graph showing the effect of the filling gas on ionization chamber response, in this graph percent response is plotted against the energy of the radiation entering the chamber for various types of filling gas.

Figure 1:
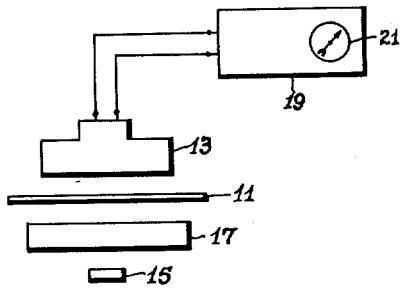
FIGURE 1 is a schematic representation of a radiation gauge, such as a thickness gauge, employing the present invention.
Figure 7:
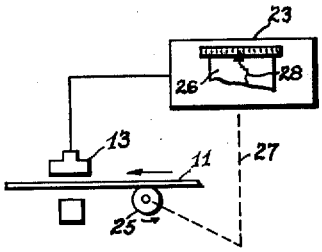

*FIG. 7 is a schematic representation of a recording system coupled into the measuring system of FIG. 1.*

When charged particles such as electrons pass through matter, they lose energy by inelastic collisions wherein a portion of their energy is transferred by electromagnetic interactions to the electrons of the atoms with which they collide, and by radiative collisions wherein the particles are decelerated in the fields of the nuclei which they pass with a resultant loss of energy and emission of electromagnetic radiation.

When electrons pass through matter, they lose energy by electromagnetic interactions which raise the electrons of the matter to excited energy states. The electrons may be raised to an excited bound state, or to a free state. In either case, the increment of energy given to the electrons is taken from the kinetic energy of the incident electrons. In the following, the term "ionization" will refer to both degrees of excitation, that is, to either an excited bound state or to a free state. The ionization loss of electrons as they pass through matter is given by the following formula. (See Montgomery, Cosmic Ray Physics, p. 30.)

$$-\frac{dE}{dx}\Big)_{ion.} = (4/\beta 2)\, N_A\, (Z/A)\, (\pi r_0^2)\, m_0c^2\, \{\ln [2m_0c^2\beta^2/I\,(1-\beta^2)]-\beta^2\}$$

where $$-\frac{dE}{dx}\Big)_{ion.}$$

is the ionization loss in ev. per gm./cm.$^2$ of an absorber; $\beta=v/c$ is the ratio of the speed of the electron to the speed of light; $N_A=6.02\times10^{23}$ atoms/gram atom (Avogadro's number); Z is the atomic number of the absorber; A is the atomic weight of the absorber;

$$r_0=e^2/m_0c^2=2.82\times10^{-13}\text{ cm.}$$

(the classical radius of the electron); $m_0c^2=0.5109\times10^6$ ev. is the rest energy of the electron; and I is the mean energy of excitation of the electrons of the absorber. This formula shows that the ionization loss by electrons is proportional to the atomic number of the absorber and inversely proportional to the square of the velocity of the incident electrons.

The loss of energy of electrons resulting in electromagnetic radiation as they pass through matter is caused by the deflection of the incident electrons in the fields of the nuclei of the matter traversed. This radiation is known as [Bramsstrahlung] *bremsstrahlung* (literally *braking* [breaking] radiation, or radiation by collision). One may consider this process as a transition from an initial state wherein the incident electrons have positive energies and the radiation field contains zero photons to states where the electrons have smaller energies and the radiation field contains photons of varying energies. The radiative loss of electrons is given by the following formula. (See Fermi, Nuclear Physics, p. 47.)

$$-\frac{dE}{dx}\Big)_{rad.}=4Z^2\frac{NE}{137}r_0^2\ln\frac{183}{Z^{1/3}}$$

where $$-\frac{dE}{dx}\Big)_{rad.}$$

is the radiative loss in ev. per gm./cm.$^2$ of an absorber; Z is the atomic number of the absorber; N is the number of nuclei/cm.$^3$ of the absorber; E is the energy of the incident electrons, and $r_0$ is the classical radius of an electron. This formula shows that the radiation loss for electrons is approximately proportional to their incident energy and to the square of the atomic number of the matter traversed.

The ratio of the radiative energy loss to the ionization loss for electrons is given roughly by $$\frac{\frac{dE}{dx}\Big)_{rad.}}{\frac{dE}{dx}\Big)_{ion.}}=\frac{Z\times(\text{mev.})}{800}$$

From this formula, one can see that free electrons which have a relatively low energy and/or which pass through matter of low atomic number, lose energy mainly through ionization, whereas free electrons which have a high energy and/or which pass through matter having a high atomic number, lose energy mainly through radiation.

In the case of beta rays (electrons) emitted by a radioisotope (where the average energy of the beta rays is generally below 2 mev.) the radiative loss of the beta rays is only a small fraction of their ionization loss. Nevertheless, it is possible to produce a useful beam of electromagnetic radiation from a beta emitting radioisotope by directing the beta rays through a target of suitable thickness to stop (filter out) most of the beta rays but which will not appreciably diminish the electromagnetic radiation which is produced in the target.

Referring now to FIGURE 1, a material 11, some characteristic of which is to be measured, is placed between a radiation detector 13 such as an ionization chamber and a preselected radioisotope 15 (Sr-90. Tl-204, etc.) which emits beta particles of a desired average energy. A target 17 of suitable composition and thickness is mounted between the beta source 15 and the material being measured so as to prevent beta rays from the source 15 from reaching the material 11 without first passing through the target 17. As the beta rays from the beta source 15 pass through the target 17, they will lose energy through ionization and radiation. The target 17 should be of sufficient thickness so that most of the beta rays, preferably over 98 percent, emitted by the beta source 15 will be stopped by the target 17. Most of the electromagnetic radiation produced in the target 17, however, will pass out of the target because of its comparatively high penetrating power. Practically all of the beta rays which pass through the target will be stopped by the material 11, whereas only a fraction of the electromagnetic radiation emitted from the target will be stopped by the material 11. The electromagnetic radiation which passes through the material 11 will bombard the ionization chamber 13, developing an ionization current which is dependent on the intensity of the electromagnetic radiation.

The output of the ionization chamber is fed in the usual manner into an amplifier 19 which amplifies the ionization current, yielding a reading on a meter 21. It will be evident that other detectors and indicating or recording mechanisms may be substituted for the ionization chamber 13 and amplifier 19 here shown.

Figure 2:
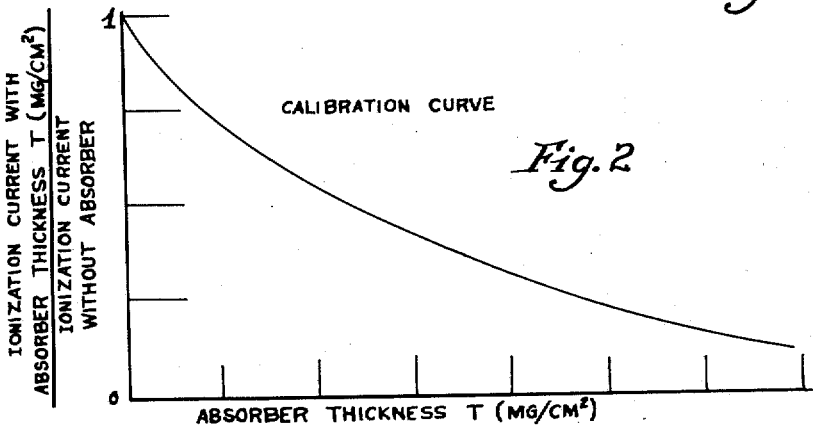
FIGURE 2 is a calibration curve using the apparatus of FIGURE 1 which is obtained by comparing ionization currents due to various thicknesses of a material with the ionization current without the material.

While it is possible to calculate the desired characteristic or property of the material 11 from the amount of electromagnetic radiation absorbed by the material 11, this is far from practical in most cases. A more economical procedure is to calibrate the indicating or recording device in terms of known values of the characteristic for the material 11. For example, in a thickness gauge one may calibrate the gauge by inserting known thicknesses of the material 11 into the gauge and plotting the radiation intensity, as observed by the readings of the meter 21, as a function of the thickness of the material 11. The curve thus obtained (not shown) is a function of both the intensity of the beta source 15 and the sensitivity of the recording system. A better calibration curve is one such as shown in FIGURE 2 which is obtained by comparing the intensities due to various thicknesses of the material 11 to the intensity without the material 11 or at some arbitrary thickness of the material 11 chosen as a standard. This curve is obviously, for a given instrument, independent of the source intensity and sensitivity of the recording system, at least as long as these factors do not vary during a series of measurements. Having obtained such a calibration curve over the desired range of thicknesses, the intensity recorded on measuring any sample of material 11 will immediately yield its thickness in terms of the standard thickness. *Referring now to FIG. 7, there is illustrated a recording system coupled into the measuring system of FIG. 1. The* [One may, of course, use a] recording meter 23 which will make a permanent record on a strip of paper *is coupled by shaft 27 to the contact roller 25* [and this strip may be coupled to the gauge] so that the movement of the paper 26 corresponds to the movement of the material 11 as it passes through the gauge; and the recorded meter deflections 28 on th paper will thereupon form a permanent record of the thickness of the material 11 as it passes through the gauge.

Figure 3:
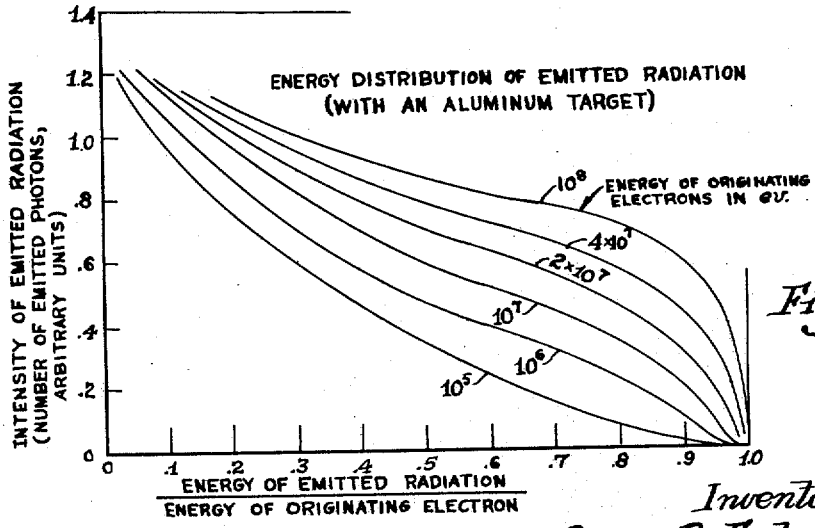
FIGURE 3 is a graph showing the energy distribution of emitted photons produced in an aluminum target for various energies of the originating electrons.

The energy of the electromagnetic radiation produced by electrons through radiative collisions with atoms may be of any value up to the energy of the originating electrons. H. A. Bethe and W. Heitler (Proc. Roy. Soc. A 146, 83, 1934) have given formulas for the probability that an electron of total energy E ev. in traversing a thickness dt will emit a photon of energy between W and W+dW. These formulas are rather complicated, and the information contained in them may be grasped more quickly perhaps in graphical than in analytical form. FIGURE 3 shows the energy distribution of emitted radiation (produced in an aluminum target) for various energies of the originating electrons. One can see that as the energy of the originating electrons increases, there is a greater probability that the electromagnetic radiation will have an energy which approaches that of the originating electrons.

The effect of the target thickness in the apparatus of FIGURE 1 when using Sr-90 as the beta source may be seen from FIGURE 4, wherein the thickness of an aluminum target in milligrams per square centimeter is plotted against the thickness of an aluminum absorber required to reduce the total radiation received by the detector to one-half its value (generally referred to as the half thickness). At relatively small target thicknesses, the beta rays from the source 15 predominate and govern the shape of the curve. As the target thickness increases, more and more of the beta rays are absorbed until the relative proportion of electromagnetic radiation to beta rays becomes large enough to affect the curve. Since the electromagnetic radiation is more penetrating than the beta rays, the half thickness of the absorber required to reduce the radiation received by the detector to one-half its value increases until the contribution of the beta rays becomes negligible. At a target thickness sufficient to stop over 98 percent of the original beta rays (greater than 6 half thicknesses for the incident beta rays), the beta rays do not materially affect the curve. In a radiation gauge which is constructed in accordance with the present invention, it is generally desirable that the detector be affected primarily by the changes in electromagnetic radiation, the target therefore should preferably have a thickness which will stop at least 98 percent of the beta rays which would otherwise reach the material being measured.

The effect of the target material in the apparatus of FIGURE 1 when using Sr-90 as the beta source can be seen from FIGURE 5, wherein there is plotted twice the thickness of the absorber required to reduce the ionization current in the detector by a factor of two against the atomic number of the absorber for targets of various atomic numbers each of the target being sufficiently thick to stop over 98 percent of the beta rays which would otherwise reach the absorber. From this graph, it can be seen that an increase in the atomic number of the target results in electromagnetic radiation of increased average energy, thereby requiring increased thicknesses of the absorber to reduce the radiation by a factor of two. In addition, it is observed that the stopping power of an absorber increases rapidly with its atomic number.

Detectors may be used which are particularly efficient for detecting electromagnetic radiation of particular energies; for example, by a proper choice of ionization chamber. It is well known that as the atomic number of the gas used in an ionization chamber is increased, the chamber becomes more efficient in detecting higher energy electromagnetic radiation. This is illustrated in FIGURE 6, wherein ionization chamber response is plotted against the energy of the electromagnetic radiation entering the ionization chamber.

It will be evident that persons skilled in the art will be able to produce and detect electromagnetic radiation of predetermined average energy level by use of an appropriate beta emitting radioisotope, target, and detector.

A practical thickness gauge was constructed in accordance with the present invention for measuring material having a weight in excess of 800 mg./cm.$^2$. A beta emitting radioisotope (both Sr-90 and Tl-204 were used) having activities between 50 and 300 millicuries proved adequate for this gauge. Targets of various materials, including carbon, aluminum, iron, and copper were used at various times in this gauge. Each target was sufficiently thick to stop 98 percent of the beta rays which would otherwise reach the material to be measured. The detector used was an ionization chamber which was filled at various times with different gases such as argon, krypton, Xenon, etc. This thickness gauge was suitable for gauging metals over the following ranges: steel, 0–0.50 inch; brass or copper, 0–0.40 inch; and aluminum, 0–3.0 inches.

As previously mentioned the present invention is applicable to other types of industrial nuclear gauges, for example, to gauges which are designed for measuring profile, density, composition, etc. Determinations such as composition are possible since the absorption of electromagnetic radiation is a function of the atomic number of the absorber. Accordingly, the invention is not limited to the specific embodiment illustrated, and other uses, modifications, and adaptations will occur to those skilled in the art. Various features of the invention believed to be new are set forth in the appended claims.

We claim:

1. In a radiation gauge, wherein one of the properties of a material may be measured by its absorption of electromagnetic radiation, a beta emitting radioisotope, a material receiving position [in] *to permit said material to pass through* said gauge which is spaced from said beta emitter, a target of preselected characteristics positioned between said beta emitter and said material receiving position to prevent beta rays from said beta emitter from reaching said material receiving position without passing through said target and so as to create a source of electromagnetic radiation which will be directed toward said material receiving position, said beta emitting radioisotope and said target being so chosen that the electromagnetic radiation emitted from said target will have a predetermined average energy, [and] a detector arranged on the side of said material receiving position away from said beta emitter and shielded therefrom by said target to detect and measure the intensity of said electromagnetic radiation not absorbed by [a] *the* material [located at] *passing through said* material receiving position, *and a continuous indicator connected to said detector to continuously indicate said property of said material as it passes through said gauge.*

2. Apparatus according to claim 1, wherein said target has a thickness sufficient to stop at least 98 percent of the beta rays from said radioisotope which are directed toward and which would otherwise reach the material receiving position.

3. In a device of the thickness gauge type in which the thickness of a material may be measured by its absorption of electromagnetic radiation, a beta emitting radioisotope, a material receiving position [in] *to permit said material to pass through* said gauge which is spaced from said beta emitter, a target of preselected characteristics positioned between said beta emitter and said material receiving position to prevent beta rays from said beta emitter from reaching said material receiving position without passing through said target and so as to create a source of electromagnetic radiation which will be directed toward said material receiving position, said beta emitting radioisotope and said target being so chosen that the electromagnetic radiation emitted from said target will have a predetermined average energy, such energy being determined by the absorption characteristics of a material, the thickness of which is to be measured, and a detector arranged on the side of said material receiving position away from said beta emitter and shielded therefrom by said target to detect and measure the intensity of said electromagnet radiation not absorbed by material [located at] *passing through said* material receiving position, *and a continuous indicator connected to said detector to continuously indicate said material as it passes through said gauge.*

4. Apparatus according to claim 3, wherein said target has a thickness sufficient to stop at least 98 percent of the beta rays from said radioisotope which are directed toward and which would otherwise reach the material receiving position.

5. A method of *measuring one of the properties of a passing material by* subjecting [a] *said passing* material to electromagnetic radiation of predetermined average energy which comprises positioning a target of preselected characteristics between a beta emitting radioisotope and said *passing* material, wherein a portion of said beta rays emitted by said radioisotope in the direction of said material will undergo radiative collisions with the nuclei of said target with resultant emission of electromagnetic radiation, said beta emitting radioisotope and said target being so chosen that said electromagnetic radiation will have a predetermined average energy, *detecting the electromagnetic radiation not absorbed by said material, correlating said detected radiation with a property of said material, and continuously indicating the property of said material as it passes said detector.*

6. A method of *measuring one of the properties of a passing material by* subjecting [a] *said passing* material primarily to electromagnetic radiation of predetermined average energy which comprises positioning a target of preselected characteristics between a beta emitting radioisotope and said *passing* material, wherein a portion of said beta rays emitted by said radioisotope in the direction of said material will undergo radiative collisions with the nuclei of said target with resultant emission of electromagnetic radiation, said beta emitting radioisotope and said target being so chosen that said electromagnetic radiation will have a predetermined average energy, and said target being sufficiently thick to stop at least 98 percent of the beta rays which are directed toward and which would otherwise reach the material, *detecting the electromagnetic radiation not absorbed by said material, correlating said detected radiation with a property of said material, and continuously indicating the property of said material as it passes said detector.*

*7. A radiation gauge for measuring the properties of a passing material, a beta emitting radioisotope, a target operative to convert beta radiation to electromagnetic radiation, said target positioned between said beta emitting radioisotope and said passing material to direct a source of electromagnetic radiation toward said material, a detector to detect and measure the intensity of said electromagnetic radiation not absorbed by the passing material, and a continuous readout means connected to said detector to continuously read out said property of the material as it passes through the gauge.*

*8. A radiation gauge for measuring the properties of a passing material, a beta emitting radioisotope, a target operative to convert beta radiation to electromagnetic radiation, said target positioned between said beta emitting radioisotope and said passing material to direct a source of electromagnetic radiation toward said material, a detector to detect and measure the intensity of said electromagnetic radiation not absorbed by the passing material, a moving strip paper recording meter connected to said detector, and means for coupling the movement of said strip paper to the movement of said passing material to form a permanent record of said property of the material as it passes through the gauge.*

*9. A radiation gauge for measuring the properties of a passing material, a beta emitting radioisotope, a target operative to convert beta radiation to X-rays, said target positioned between said beta emitting radioisotope and said passing material to direct a source of X-rays toward said material, a detector to detect and measure the intensity of said X-rays not absorbed by the passing material, and a continuous readout means connected to said detector to continuously read out said property of the material as it passes through the gauge.*

*10. A radiation gauge for measuring the properties of a passing material, a beta emitting radioisotope, a target operative to convert beta radiation to X-rays, said target positioned between said beta emitting radioisotope and said passing material to direct a source of X-rays toward said material, a detector to detect and measure the intensity of said X-rays not absorbed by the passing material, a moving strip paper recording meter connected to said detector, and means for coupling the movement of said strip paper to the movement of said passing material to form a permanent record of said property of the material as it passes through the gauge.*

*11. A radiation gauge for measuring the properties of a passing material, a beta emitting radioisotope, a target operative to convert beta radiation to electromagnetic radiation, said target positioned between said beta emitting radioisotope and said passing material to direct a source of electromagnetic radiation toward said material, a detector to detect and measure the intensity of said electromagnetic radiation not absorbed by the passing material, means for correlating said detected radiation as a thickness function of said material and a continuous readout means connected to said detector to continuously read out said thickness of the material as it passes through the gauge.*

*12. A radiation gauge for measuring the properties of a passing material, a beta emitting radioisotope, a target operative to convert beta radiation to electromagnetic radiation, said target positioned between said beta emitting radioisotope and said passing material to direct a source of electromagnetic radiation toward said material, a detector to detect and measure the intensity of said electromagnetic radiation not absorbed by the passing material, means for correlating said detected radiation as a thickness function of said material, a moving strip paper recording meter connected to said detector, and means for coupling the movement of said strip paper to the movement of said material to form a permanent record of said thickness of the material as it passes through the gauge.*

*13. A radiation gauge for measuring the properties of a passing material, a beta emitting radioisotope, a target operative to convert beta radiation to X-rays, said target positioned between said beta emitting radioisotope and said passing material to direct a source of X-rays toward said material, a detector to detect and measure the intensity of said X-rays not absorbed by the passing material, means for correlating said detected radiation as a thickness function of said material and a continuous readout means connected to said detector to continuously read out said thickness of the material as it passes through the gauge.*

*14. A radiation gauge for measuring the properties of a passing material, a beta emitting radioisotope, a target operative to convert beta radiation to X-rays, said target positioned between said beta emitting radioisotope and said passing material to direct a source of X-rays toward said material, a detector to detect and measure the intensity of said X-rays not absorbed by the passing material, means for correlating said detected radiation as a thickness function of said material, a moving strip paper recording meter connected to said detector, and means for coupling the movement of said strip paper to the movement of said material to form a permanent record of said thickness of the material as it passes through the gauge.*

*15. In a radiation gauge for measuring a property of a passing material, a radioisotope providing a source of beta radiation having insufficient energy to effect substantial penetration of the thickness of said material, a target for converting said beta radiation to bremsstrahlung having more than sufficient energy to effect substantial penetration of the thickness of said material, said radioisotope and said target being positioned on one side of said material to direct said bremsstrahlung toward said material, and means, which includes a bremsstrahlung detector positioned on the opposite side of said material and substantially completely shielded thereby from said beta radiation, responsive to variations in the intensity of said bremsstrahlung penetrating said material for indicating the variations in said property as said material passes said gauge.*

*16. In a radiation gauge for measuring a property of a passing material, a radioisotope providing a source of beta radiation having insufficient energy to effect substantial penetration of the thickness of said material, a target for converting said beta radiation to bremsstrahlung having a distribution of energies including a major portion having energies more than sufficient to effect substantial penetration of the thickness of said material, said radioisotope and said target being positioned on one side of said material to direct said bremsstrahlung toward said material, and means responsive to variations in the intensity of said major portion of said bremsstrahlung for indicating the variations in said property as said material passes said gauge, said intensity variation responsive means including a bremsstrahlung detector selectively responsive to bremsstrahlung having predetermined energies in said distribution, whereby the calibration curve for said gauge attains an optimum shape.*

*17. In a radiation gauge for measuring a property of a passing material, a radioisotope providing a source of beta radiation having insufficient energy to effect substantial penetration of the thickness of said material, a target for converting said beta radiation to bremsstrahlung having a distribution of energies including a major portion hav-*

*ing energies more than sufficient to effect substantial penetration of the thickness of said material, said radioisotope and said target being positioned on one side of said material to direct said bremsstrahlung toward said material, and means responsive to variations in the intensity of said major portion of said bremsstrahlung for indicating the variations in said property as said material passes said gauge, said intensity variation responsive means including a bremsstrahlung detector positioned on the opposite side of said material and substantially completely shielded thereby from said beta radiation, said detector being selectively responsive to bremsstrahlung having predetermined energies in said distribution, whereby the calibration curve for said gauge attains an optimum shape.*

*18. A method of measuring one of the properties of a passing material by subjecting said passing material to electromagnetic radiation of predetermined average energy which comprises positioning a target of preselected characteristics in the path of beta rays from a beta emitting radioisotope, whereby a portion of said beta rays emitted by said radioisotope in the direction of said target will undergo radiative collisions with the nuclei of said target with resultant emission of electromagnetic radiation, said beta emitting radioisotope and said target being*

*so chosen that said electromagnetic radiation will have a predetermined average energy, said energy imparting to said electromagnetic radiation greater penetrating power than beta rays from said radioistotope, passing at least some of the resulting electromagnetic radiation through such thickness of said material that substantially none of said beta rays pass therethrough, detecting the electromagnetic radiation from said target passing through said material, correlating said detected radiation with a property of said material, and continuously indicating the property of said material as it passes said detector.*

References Cited in the file of this patent or the original patent

UNITED STATES PATENTS

| | | |
|---|---|---|
| 2,389,403 | Arnold | Nov. 20, 1945 |
| 2,508,772 | Pontecorvo | May 23, 1950 |
| 2,629,831 | Atchley | Feb. 24, 1953 |
| 2,675,479 | Stewart et al. | Apr .13, 1954 |
| 2,675,482 | Brunton | Apr. 13, 1954 |
| 2,675,483 | Leighton et al. | Apr. 13, 1954 |
| 2,686,268 | Martin et al. | Aug. 10, 1954 |
| 2,797,333 | Reiffel | June 25, 1957 |